W. BUTTERWORTH.
GLASS-BALL TARGETS.

No. 195,569. Patented Sept. 25, 1877.

UNITED STATES PATENT OFFICE.

WILLIAM BUTTERWORTH, OF CORNING, NEW YORK, ASSIGNOR TO CORNING GLASS WORKS, OF SAME PLACE.

IMPROVEMENT IN GLASS-BALL TARGETS.

Specification forming part of Letters Patent No. 195,569, dated September 25, 1877; application filed September 7, 1877.

*To all whom it may concern:*

Be it known that I, WILLIAM BUTTERWORTH, of Corning, in the county of Steuben and State of New York, have invented certain new and useful Improvements in Glass Balls for Target-Shooting; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to balls made of brittle material, the main portion of which is preferably made of glass, intended to be used for target-shooting, said balls being sprung from traps or otherwise thrown up, where shot-guns are used in said target-shooting, the intention being to so construct a ball that, if a shot strikes the same, it will break it.

To illustrate my invention I have shown a glass ball blown in a smooth mold, with sand or other suitable substance of like character applied to the surface of the glass when in a molten condition and before the blowing of the ball, the ball then being blown in a smooth mold, leaving the same, when finished, with a surface resembling sand-paper, which has been found in use to produce a ball for shot-gun target-shooting much superior to any heretofore in use.

Figure 1:
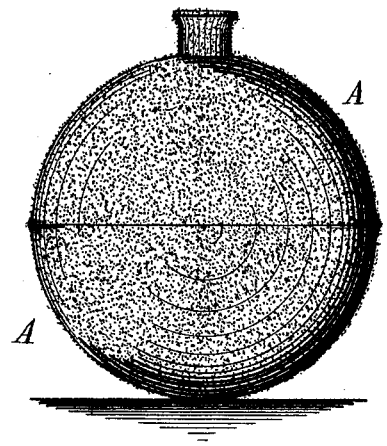
Figure 2:
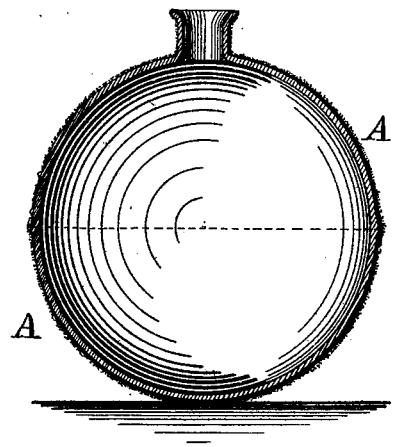

In the annexed drawings, Figure 1 represents a side elevation of a device embodying my invention, and Fig. 2 a section of the same.

A represents a ball, which is preferably made spherical or round; but it may be changed in form, if so desired.

In the manufacture of these balls any known form of molds may be used. The balls are blown, the material being placed within the mold in the usual manner.

When the glass is in a molten condition, and before blowing the ball, sand or any equivalent substance is placed upon the surface of the glass, and the glass then blown in the mold to form a ball. This provides a ball with a surface similar to sand-paper or a sand-shark's skin, which will hold the shot when the same strikes the ball, thus causing the ball to be easily broken by the shot, which would not be the case if the ball were smooth.

I am aware that balls have heretofore been used for this purpose formed entirely of glass, and having serrated or corrugated outer surfaces, and I do not claim such as my invention; but,

Having thus fully described the invention, what is claimed as new, and desired to be secured by Letters Patent, is—

A glass ball for target-shooting, provided with sand or its equivalent upon the outer surface thereof for the purpose of making a rough surface, substantially as and for the purpose herein set forth.

In testimony that I claim the foregoing as my own I have hereto affixed my signature in presence of two witnesses.

WILLIAM BUTTERWORTH.

Witnesses:
ELLSWORTH D. MILLS,
A. HOUGHTON, Jr.